United States Patent [19]
Corbett

[11] Patent Number: 5,551,831
[45] Date of Patent: Sep. 3, 1996

[54] METHOD AND APPARATUS FOR ELEVATING A CARGO CONTAINER CHASSIS FOR STORAGE

[75] Inventor: Nelson H. Corbett, Portland, Oreg.

[73] Assignee: Chassis Systems, Inc., Portland, Oreg.

[21] Appl. No.: 412,543

[22] Filed: Mar. 29, 1995

[51] Int. Cl.$^6$ .................................................. B65G 57/08
[52] U.S. Cl. ........................ 414/786; 414/619; 414/783; 414/261; 414/798.2; 211/13
[58] Field of Search .................................. 414/261, 373, 414/608, 619, 621, 622, 678, 783, 798.2, 786; 211/13; 410/43, 93

[56] References Cited

U.S. PATENT DOCUMENTS

| | | | |
|---|---|---|---|
| 3,239,944 | 3/1966 | Gebert | 414/749 |
| 3,314,561 | 4/1967 | Chaney | 414/621 |
| 3,687,300 | 8/1972 | Anderson | 414/483 |
| 3,790,003 | 2/1974 | Tauscheck | 414/483 |
| 4,437,807 | 3/1984 | Perrott | 414/620 |
| 4,493,421 | 1/1985 | Matthewson et al. | |
| 4,549,663 | 10/1985 | Corrett, Jr. et al. | 111/13 |
| 4,583,902 | 4/1986 | Riley | 414/261 |
| 4,600,350 | 7/1986 | Matthewson et al. | 414/267 |
| 4,664,576 | 5/1987 | Coe | 414/607 |
| 4,826,384 | 5/1989 | Okura et al. | |
| 4,952,118 | 8/1990 | Macmillan | |

FOREIGN PATENT DOCUMENTS 285754  11/1962  Netherlands ............................ 414/678

*Primary Examiner*—Karen Merritt
*Assistant Examiner*—Douglas Hess
*Attorney, Agent, or Firm*—Klarquist Sparkman Campbell Leigh & Whinston LLP

[57] ABSTRACT

A method, apparatus and system for elevating a cargo container chassis for storage in a substantially vertical position. The chassis is positioned on a lifting platform having a hinged axis around which the platform may tilt upwardly. The platform is then tilted upwardly to lift the chassis to an elevated position in which the longitudinal axis of the chassis approaches or assumes a vertical or upright position. The chassis may then be transferred to a transport vehicle. The transport vehicle does not actively tilt the chassis upward, but instead accepts the already tilted chassis and transfers it to a storage area for vertical storage. This method thereby avoids the necessity of a transport vehicle firmly clamping the chassis and actively tilting it into the storage position, which may damage the chassis. Also, the transport vehicle need not be fitted with expensive heavy tilting devices, and a very large and heavy chassis may more easily be moved to the vertical storage position.

29 Claims, 4 Drawing Sheets

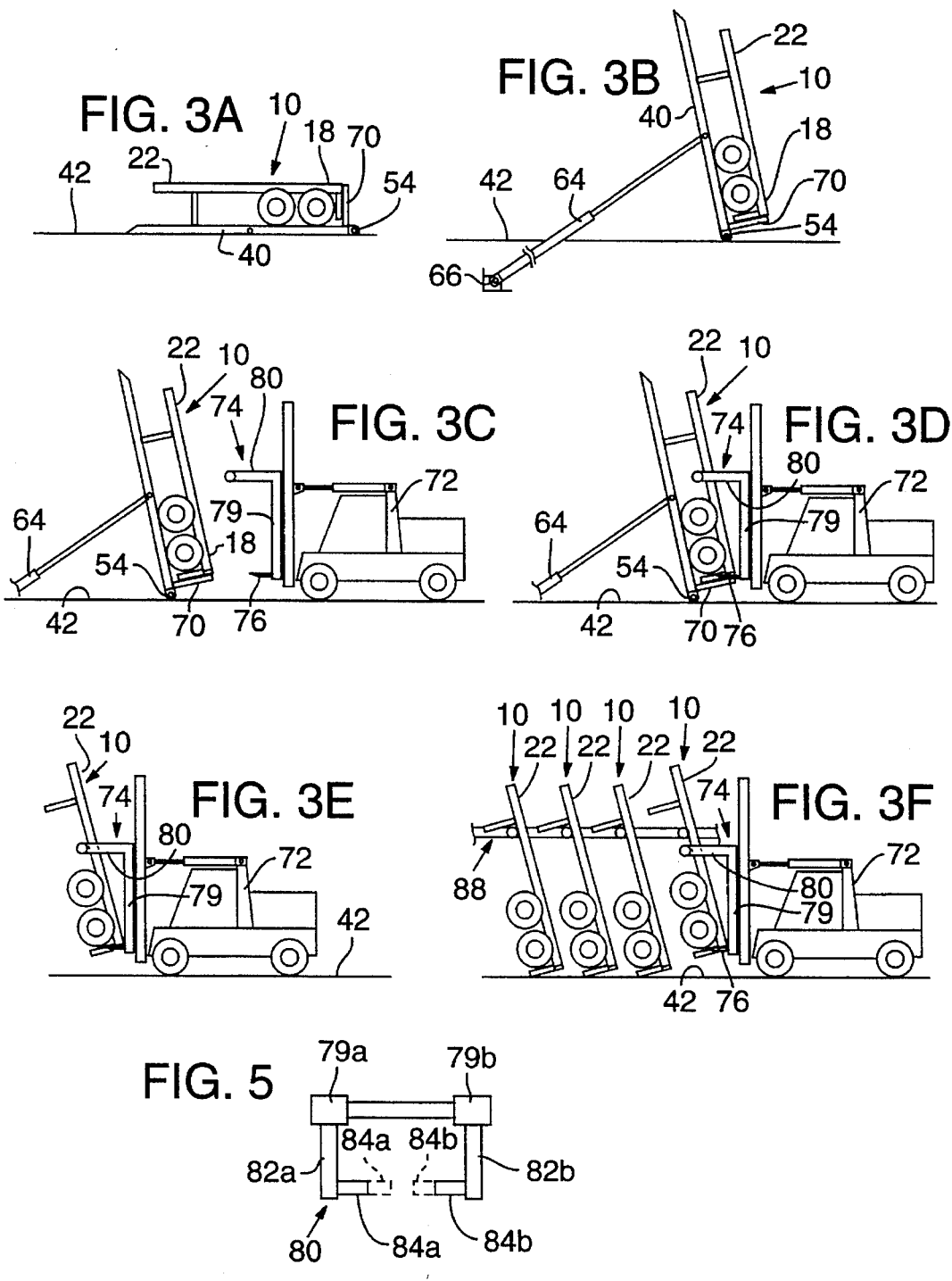

METHOD AND APPARATUS FOR ELEVATING A CARGO CONTAINER CHASSIS FOR STORAGE

BACKGROUND OF THE INVENTION

1. Field of the Invention

The present invention relates to a method and apparatus for storing a cargo container chassis when it is not in use. More particularly, the invention concerns tilting the cargo container chassis to a raised position in which it can be stored while occupying a minimum amount of space.

2. General Description of the Background

Truck drawn cargo container trailer chassis are used to transport goods in large, detachable shipping containers. The containers are detached from the chassis at a railway or seaport terminus, where the containers and goods may then be shipped by rail or boat in the container. A large number of empty trailer chassis must then be stored at or near ship and rail terminals when the chassis are not in use. Storing such a large number of chassis is a problem because they are large and obtrusive. They obstruct the free flow of traffic and occupy often valuable land near seaports and other congested areas. In addition to occupying valuable space, the chassis may also be damaged or stolen while stored.

It has been suggested that a chassis may be stored most efficiently in an upright position in storage racks, such as the storage racks shown in U.S. Pat. No. 4,549,663 and U.S. Pat. No. 4,493,421. One problem with these storage methods, however, is that the chassis must be clamped by a specially designed clamping apparatus which is attached to a lift truck. Examples of such specially designed clamping mechanisms are shown in U.S. Pat. No. 4,437,807, U.S. Pat. No. 4,583,902 and U.S. Pat. No. 4,600,350.

The use of such clamps presents several significant problems. The clamps themselves must firmly engage the heavy chassis to rotate it from a horizontal to a vertical position. The clamps must also exert significant compressive or frictional force against the heavy chassis to rotate it, and such forces can damage a light weight chassis, particularly after repeated applications. Moreover, the clamping attachment is an expensive, unwieldy piece of equipment that increases the cost of the storage operation.

Yet another problem with these previous systems is that cargo container chassis are becoming longer and often heavier. The economics of transporting goods dictates that ever greater amounts and weights of materials be transported at a single time. In some cases they may merely be made longer, but of the same or lighter materials and thus do not have the higher beam strength of prior devices. The longer and heavier, or possibly longer and more flimsy chassis are therefore more difficult to lift, often requiring greater clamping forces. Moreover, the transport vehicles which clamp the chassis must also be made larger and heavier to counteract the increased weight of the chassis that is being manipulated. Finally, it is expensive and difficult to manufacture tiltable booms that can raise such a heavy chassis to a vertical orientation. The weight of the boom, attached clamp and heavy chassis requires extraordinarily durable and expensive hydraulic lifts to move the boom and the attached trailer.

It is therefore an object of this invention to provide a system and method for storing a cargo container chassis, but which avoids the necessity of clamping and possibly damaging the chassis.

It is yet another object of the invention to provide a means for lifting a heavy chassis without the necessity of making a heavier and correspondingly more expensive lift and transport vehicle.

Yet another object of the invention is to provide such a method and mechanism that can economically and efficiently raise a variety of different kinds of chassis to a generally vertical position in which the chassis is transported to a storage structure and stored.

SUMMARY OF THE INVENTION

The foregoing objects are achieved by the present method and apparatus for storing a cargo container trailer chassis. The chassis is positioned on the upper surface of a lifting platform, and the platform pivots around a hinged axis to tilt the lifting platform and raise the chassis to an elevated position in which the chassis is transferred to a transport vehicle. The transport vehicle does not actively tilt the chassis upward, but instead accepts the already tilted chassis and transfers it in this upright orientation to a storage area for upright or vertical storage.

In a particularly disclosed embodiment, the elongated chassis includes an elongated trailer frame having a rear end and a front end, with a set of rear wheels supporting the rear end of the frame, and a downwardly projecting jack supporting the front end of the frame after its release from a truck tractor. The lifting platform has an upper surface that is coextensive or at least continuous with a surrounding support surface (such as the asphalt surface of a parking area). An upright support member extends upwardly from the lifting platform, preferably along the hinged axis, to form a raised barrier. The chassis is positioned on the upper surface of the lifting platform with the rear end of the chassis frame against the support member. The lifting platform is then rotated upwardly around the hinged axis to tilt the platform and chassis. The rear end of the frame is supported passively by the upright support member, as the lifting platform is rotated, to prevent the wheeled chassis from rolling off the platform. The front end of the chassis is thereby lifted through an arc toward an elevated position, in which the chassis approaches or assumes a substantially vertical or upright orientation.

The chassis is then transferred in the elevated position from the lifting platform to a transport vehicle. The transport vehicle inserts a support element (such as fork lift forks) underneath the rear end of the trailer chassis, to lift the chassis off the support member. The forks raise the wheeled chassis upwardly along the surface of the lifting platform and away from the support member, and the weight of the raised chassis is transferred to the transport vehicle. A stabilizer on the transport vehicle is selectively engaged around the chassis to secure the chassis to the transport vehicle, and stabilize the chassis on the support member. The chassis is then moved from the lifting platform to a storage structure in substantially the same position or orientation in which it was lifted from the platform on to the transport vehicle. The chassis is stored in the storage structure in substantially the same upright orientation in which it was lifted from the platform and transported to the storage structure.

Lifting the chassis to a vertical orientation on the platform avoids the necessity of clamping the chassis firmly so that the transport vehicle can lift the chassis to an elevated position. The present invention thereby avoids denting or otherwise damaging the chassis with forceful clamping and lifting. Moreover, the platform is capable of lifting a variety of chassis, even very heavy ones, without the necessity of providing very large or heavy transport vehicles, with their required heavy counterweights, while the chassis is being tilted. The lifting platform also avoids the design difficulties of providing a transport vehicle with a heavy elongated boom and attached clamp that must be moved from a horizontal to a vertical position to tilt an attached chassis into an upright storage position. Since the transport vehicle need not have sufficient power and counterweight to raise the chassis to an upright position, smaller and less powerful vehicles may be used to increase efficiency and economy of the storage operation.

BRIEF DESCRIPTION OF THE DRAWINGS

FIG. 3A is a schematic depiction of the chassis in place on the lifting platform prior to tilting the platform upwardly.

FIG. 3B is a view similar to FIG. 3A, but showing the platform and chassis after they are tilted to a raised position.

FIG. 3C is a view similar to FIG. 3A, but showing the transport vehicle approaching the elevated chassis.

FIG. 3D is a view similar to FIG. 3A, but showing the transport vehicle inserting its lifting forks beneath the chassis to transfer the chassis to the transport vehicle.

FIG. 3E is a schematic depiction of the chassis, after it has been transferred to the transport vehicle, and in route to the storage facility.

FIG. 3F is a schematic depiction of the transport vehicle unloading the elevated chassis into the storage facility.

FIG. 4 is a fragmentary plan view of a storage structure of the present invention in which the chassis is stored.

FIG. 5 is a top plan view of a transport attachment that is carried by a transport vehicle in accordance with the present invention.

DETAILED DESCRIPTION OF THE PREFERRED EMBODIMENT

Figure 1:
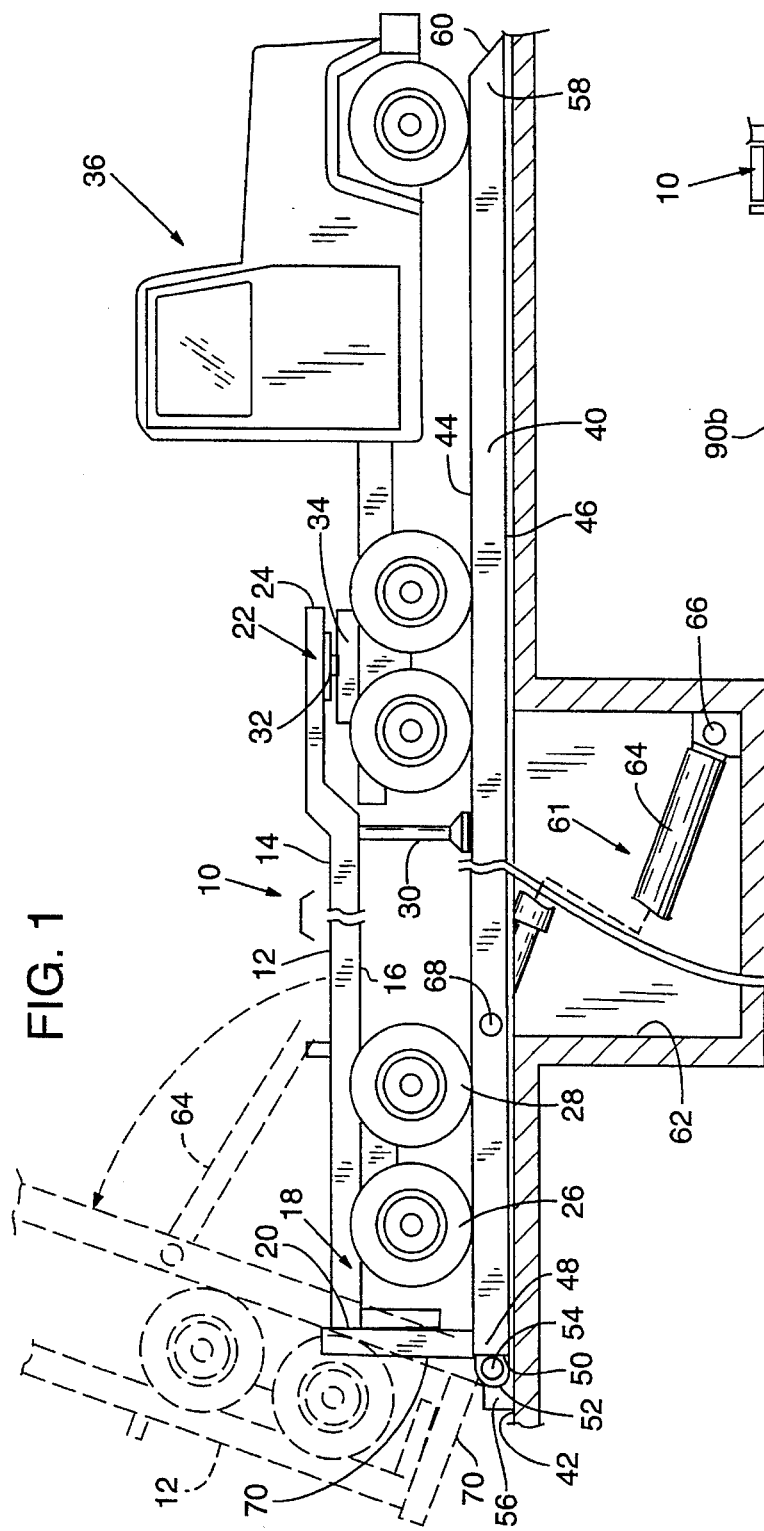
FIG. 1 is a fragmentary side view of the lifting platform of the present invention, partially in cross-section, with the elevated position of the platform and chassis shown in phantom.
Figure 2:
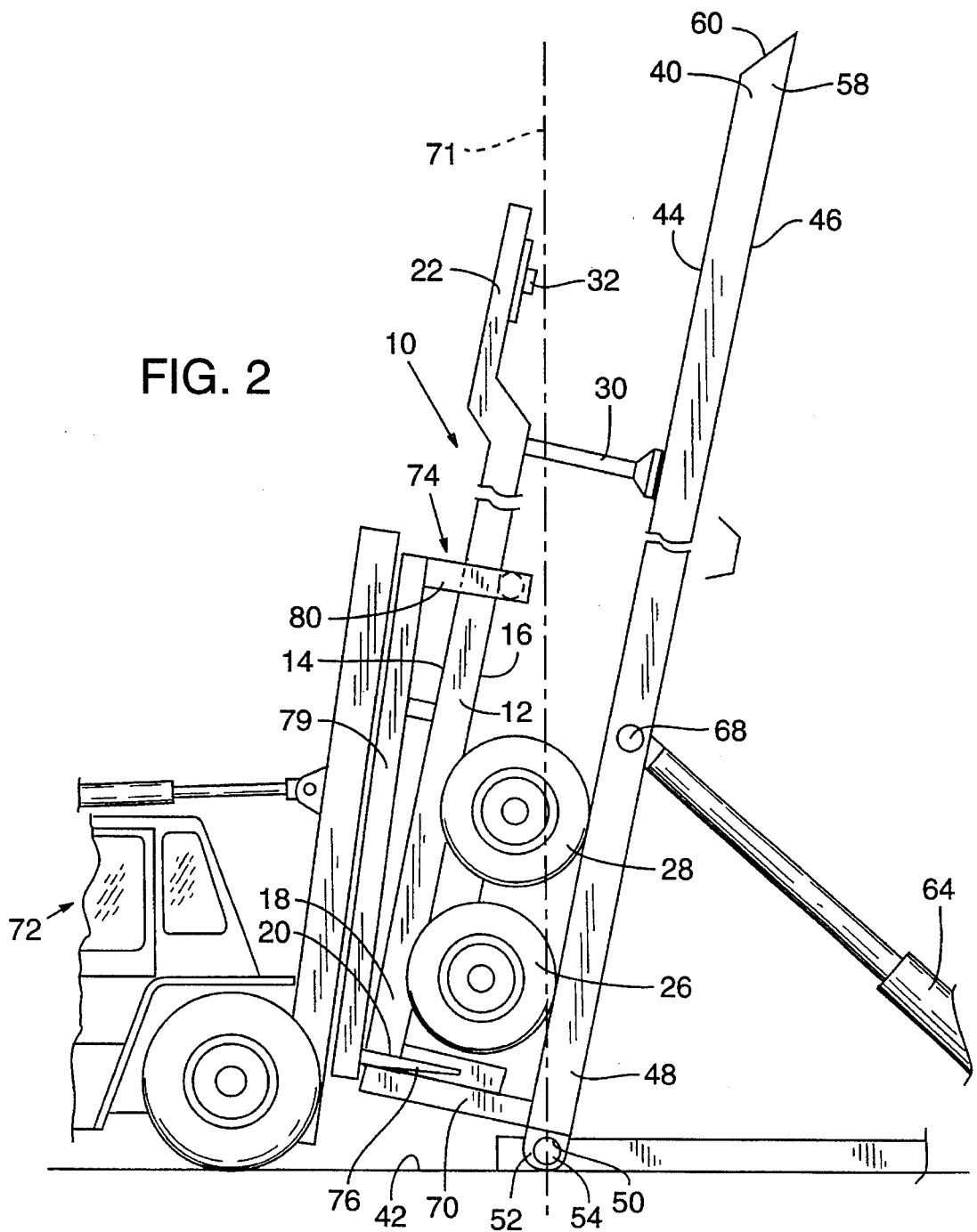
FIG. 2 is a side view showing the platform tilted upwardly to present the chassis to a transport vehicle, and the attachment on the transport vehicle to which the chassis is transferred.

The drawings illustrate a preferred embodiment of the method and apparatus for storing a cargo container chassis 10 in an elevated position. The trailer chassis itself is shown in FIGS. 1 and 2 to include an elongated generally rectangular trailer frame 12 with a top surface 14 and bottom surface 16. Frame 12 extends longitudinally between a rear end 18 that terminates in a flat face 20, and a front end 22 that terminates in a flat face 24. A first and second tandem set of rear wheels 26, 28 on conventional axles support the rear end 18 of the frame, while a downwardly projecting support jack 30 supports the front end 22 of the frame. A conventional fifth wheel coupling assembly 32 is located on a lower face of the front end 22 to engage a cooperative coupling assembly 34 carried by a truck tractor 36.

An elongated lifting platform 40 is placed horizontally either coextensive with a surrounding ground surface (not shown in the drawings), or placed on and supported by the ground surface 42 (as shown in FIG. 1). The surrounding surface is, for example, an asphalt parking lot. The platform 42, which is preferably a large rectangular steel plate, has a flat upper surface 44 and a flat lower surface 46. Appropriate reinforcing structure may be secured to the plate, but these reinforcements are deleted from the drawings for clarity in illustration.

A rear transverse end 48 of the platform 42 has a hinged edge 50, with opposing projecting ears 52 (only one of which is shown in FIG. 1) through which is journaled a steel hinge pin 54. A heavy flat steel plate 56 secured to surface 42 fixes pin 54 in place, and provides a stable axis along rear edge 50 about which platform 40 rotates. A transverse front edge 58 of platform 40 is beveled to form a ramp 60 that allows a truck and trailer to be easily maneuvered on to platform 40.

A lifting mechanism 61 is shown in FIG. 1 for tilting platform 40 around edge 50 to an elevated position. Mechanism 61 is preferably placed in a pit 62 immediately below platform 40, and includes a piston and cylinder assembly 64 that extends from a first hinged connection 66 at the bottom of pit 62, to a second hinged connection 68 on lower surface 46 at about the mid-portion of plate 40. Where only one raising piston is used, as illustrated here, connection 68 is preferably at the longitudinal centerline of platform 40. In the depicted embodiment of FIGS. 1, 2 and 3, assembly 64 extends upwardly and toward hinged edge 50. Extension of piston and cylinder assembly 64 exerts a lifting force against lower surface 46 of platform 40 to tilt platform 40 upwardly around the hinged edge 50.

An upright steel support plate or member 70 extends upwardly from platform 40 substantially perpendicular to upper surface 44. Member 70 is at least high enough to serve as a barrier that prevents trailer chassis 10 from rolling off platform 40 as the platform tilts upward. In the depicted embodiment, member 70 is as high as rear end 18 of trailer frame 12. Alternatively, member 70 may be shorter, and only high enough to serve as a chock behind rear wheels 26. Member 70 is shown extending along hinged edge 50, but it may also be positioned anterior to edge 50, closer to front edge 58. Member 70 is preferably sufficiently near edge 50 to allow easy transfer of chassis 10 to the transport vehicle after platform 40 has been tilted.

Figure 8:
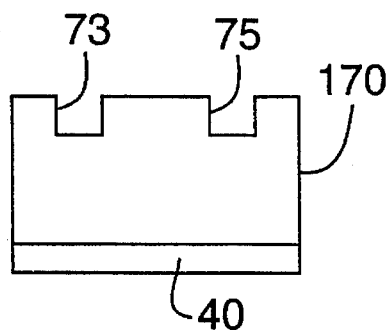
FIG. 8 is a rear elevational view of one embodiment of the support member, showing slots in the member through which forks may pass to lift the chassis off the support member.

As best shown in FIG. 8, member 70 has slots 73, 75 extending downwardly from the top edge of member 70 towards platform 40. Slots 73, 75 are at least as wide as fork-lift forks (described below) that lift chassis 10 away from support member 70. Although only two slots are shown in the drawings, numerous such slots may in fact be provided along the top edge of member 70.

In one preferred embodiment of the storage method, the still interconnected truck tractor 36 and trailer chassis 10 are maneuvered to back the chassis 10 on to platform 40 until flat face 20 of rear end 18 abuts support member 70. Although both the truck 36 and chassis 10 are shown in place on top of platform 20 in FIG. 1, the platform may be shorter relative to the length of the truck and trailer assembly such that only the chassis portion moves on to the platform. Once the chassis 10 is positioned on the platform 40, coupling assembly 32, 34 is disconnected in the usual fashion and truck 36 is driven away, leaving chassis 10 in the position shown in FIG. 3A.

The remaining steps of the method are shown in FIGS. 3B–3F, which are a series of drawings depicting one preferred sequence of events in accordance with the claimed method and system. Once the tractor 36 has been disconnected from chassis 10 and driven away, chassis 10 remains in position on platform 40 with flat face 20 of rear end 18 abutting member 70. Piston and cylinder assembly 64 is then actuated to extend the piston, and act as a ram that exerts sufficient force against lower surface 46 of platform 40 to tilt the platform 40 and chassis 10 supported thereon. During tilting, front end 22 of chassis 10 moves upwardly through an arc away from ground surface 42, and rear end 18 moves downwardly through an arc towards ground surface 42. The pivotal connections 66, 68 at each end of piston and cylinder assembly 64 allow the assembly to pivot as it rotates the lifting platform 40. During tilting, rear end 18 of chassis 10 is supported by support member 70 such that chassis 10 does not roll off platform 40.

As shown in FIGS. 2 and 3B, chassis 10 and platform 40 are preferably tilted to an angle approaching vertical, such as the vertical line 71 in FIG. 2. Platform 40 may approach vertical by being tilted, for example, to an angle of sixty to ninety degrees relative to surface 42. In the illustrated preferred embodiment, they are tilted to an angle of approximately seventy to eighty degrees. At this orientation, chassis 10 may be approached by a transport vehicle 72, which may be a conventional fork-lift vehicle with a transport attachment 74 on its working end. Attachment 74 (shown in greatest detail in FIGS. 2 and 5) includes short fork-lift forks 76 (only one of which is shown in the drawings), which serve as support elements that may be inserted as wedges between flat face 20 of rear end 18 and the support member 70. Alternatively, the forks are inserted through slots 73, 75 of member 70 and then raised to abut rear face 20 of chassis 10. Forks 76 are moved up and down with a translatable plate, or between parallel track bars 79a, 79b (FIG. 5) to which forks 76 are attached. The forks are preferably short so that they can be easily maneuvered beneath chassis 10.

A stabilizer 80 is fixed at the top of bars 79a, 79b, and includes a C-shaped bracket that can enclose a portion of chassis 10 to stabilize it in position on transport attachment 74. The bracket has parallel arms 82a, 82b extending outwardly from bars 79a, 79b, respectively, and extendable cross bars 84a, 84b (FIG. 5) projecting toward each other adjacent the outer ends of arms 82a, 82b. Cross bars 84a, 84b are extendable and retractable, between a retracted position shown in solid lines, and an extended position shown in phantom lines. The gap between bars 84a, 84b in the retracted position is at least as wide as the width of trailer frame 12. When the bars are extended, the gap between the tips of the bars 84a, 84b is less than the width of trailer frame 12. Hence, stabilizer 80 (with cross bars 84 in the retracted position) can be moved into place around trailer frame 12, with bars 79 adjacent top surface 14 of trailer frame 12, and cross bars 84a, 84b adjacent bottom surface 16. Cross bars 84a, 84b are then extended (to the position shown in phantom lines in FIG. 5) to at least partially enclose trailer frame 12 and stabilize it in a balanced position on forks 76.

As forks 76 move up through slots 73, 75 of support member 70 and abut rear end 18 of trailer frame 12, the weight of chassis 10 is transferred to the transport attachment 74 (FIG. 3D). Cross bars 84a, 84b of stabilizer 80 are then extended to enclose trailer frame 12 without clamping it, and transport vehicle 72 backs away from platform 40 with chassis 10 lashed to transport attachment 74 and balanced thereon (FIG. 3E). Chassis 10 is thereby transferred to transport vehicle 72 without the transport vehicle 72 actively tilting chassis 10 upwardly. Some minor tilting of the chassis 10 may occur during this transfer operation as the trailer frame seeks a new equilibrium balance, but the transport vehicle neither has to clamp the chassis nor exert active force to tilt it to an upright position.

Although a preferred embodiment of a non-clamping transport mechanism has been described it should be recognized that clamping styles could be used also. For example, clamps mounted on the mast of the transport vehicle could clamp onto opposite sides of the chassis to grasp it and support it for transport. Such a vehicle would still be able to receive the chassis in a substantially upright orientation and would not be required to raise the chassis from the horizontal.

Transport vehicle 72 then moves chassis 10 to a storage facility 88 (FIGS. 3F and 4) in the same general position in which the chassis was transferred to the transport vehicle. Chassis 10 is then transferred to and stored in the storage facility 88 in the same generally elevated upright or vertical orientation in which the chassis was transported to the facility. The chassis may be stored, for example, by hanging it from support jack 30 or coupling 32 on a rack provided for that purpose. Alternatively, the upright tilted chassis may merely be rested against an elevated support arm. After transfer to the rack, chassis 10 may change its upright orientation somewhat as it once again assumes a new equilibrium balance. This change in balance orientation is included within the definition of a same general upright or vertical orientation.

Alternatively, the storage facility 88 may be a rack 90, as shown in FIG. 4, which is supported above a support surface, such as ground surface 42. Rack 90 includes a series of support arms 92 pivotally mounted at spaced positions along rack 90 for movement between a retracted position (arm 92a) and an extended position (arm 92b). In the extended position, arm 92b projects laterally outward of the rack 90 such that chassis 10 may be stored in a substantially vertical position while supported on an arm of rack 90, or between the extended arms of two adjacent racks 90.

Chassis 10 is unloaded from transport vehicle 72 by driving vehicle 72 up to an open arm of rack 90, resting the lower or tail end of the chassis on the ground or other support surface provided, resting the upper or front end of the chassis in a slightly inclined position against rack 90, and opening stabilizer 80. Once chassis 10 is supported on open arm 92b, transport vehicle 74 is backed away leaving the chassis on the rack (FIG. 4).

A storage rack suitable for storing the chassis in accordance with the present invention is shown more fully in U.S. Pat. No. 4,549,663 which is incorporated herein by reference.

In yet another embodiment of the invention, the interconnected truck tractor 30 and trailer chassis 10 are driven in a forward direction onto platform 40, instead of backing them onto the platform. Forward movement of the tractor 30 is permitted by a hinged support member 170 that pivots between a flat position (FIG. 7) in which the support member 170 is folded down against the platform 40, and an upright position (FIG. 6) in which support member 170 is locked upright against the flat face 20 of chassis rear end 18.

Figure 6:
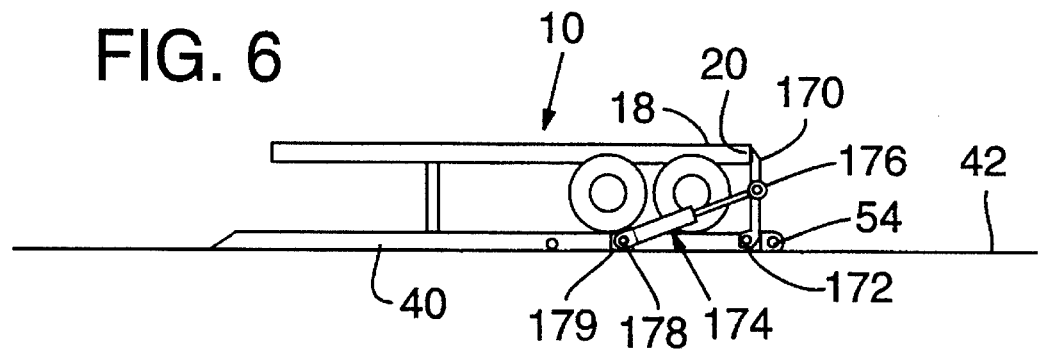
FIG. 6 is a schematic side view of an alternative embodiment of the lifting platform in which the upright support member is pivotally attached to the lifting platform.
Figure 7:
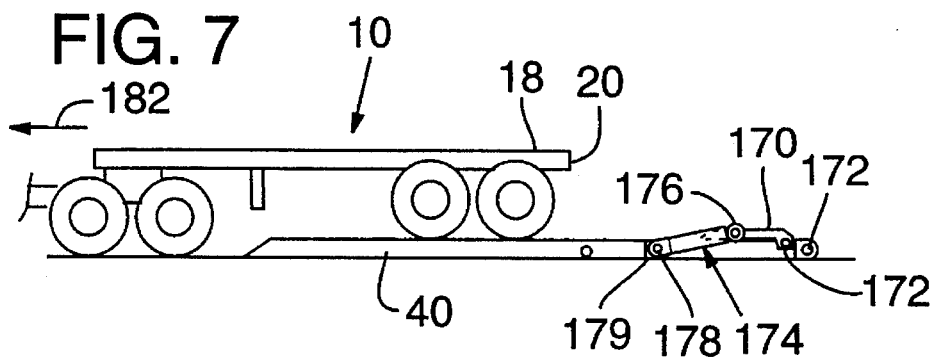
FIG. 7 is a view similar to FIG. 6 in which the support member has been pivoted to a flat position to enable a truck and cargo container to drive in a forward direction on to the platform without impediment.

Member 170 pivots about a hinge 172 between the flat and upright positions, and movement between these two positions can be assisted with a pair of hydraulic piston and cylinder assemblies 174 (only one of which is shown in FIGS. 6 and 7), pivotally attached at each end 176, 178 thereof. End 178 is attached to a side edge of platform 40 by ears 179 extending transversely outward from the platform along opposing longitudinal edges of the platform. A plurality of slots (not shown, but similar to slots 73, 75) extend downwardly from the top edge of member 170 for receiving fork lift forks therethrough.

For the embodiment shown in FIGS. 6 and 7, the method is modified by first lowering the member 170 to the horizontal loading position shown in FIG. 7. The tractor 36 and attached trailer chassis 10 are then driven in the direction of arrow 182, over member 170 and onto platform 40, and forward motion is stopped when flat rear face 20 of chassis 10 moved past member 170. Hydraulic assembly 174 is then actuated to move member 170 from the loading position of FIG. 7 to the upright position of FIG. 6, and lock it in place. The trailer chassis then is backed against member 170, and the remainder of the method is then the same as earlier described, in which platform 40 is tilted, and a fork lift raises chassis 10 off of member 170 to transport it to a storage facility.

Having illustrated and described several embodiments of the invention, those skilled in the art will appreciate that the invention can be modified in arrangement and detail without departing from its principles. Accordingly, we claim all modification and variations coming within the spirit and scope of the following claims.

We claim:

1. A method of storing a cargo container chassis, comprising the steps of:

providing a lifting platform that pivots around a hinged axis, wherein the lifting platform has an upper surface and a lower surface;

positioning the chassis on the upper surface of the lifting platform; and rotating the lifting platform around the hinged axis, to tilt the lifting platform and raise the chassis to an elevated position in which the chassis is transferred to a transport vehicle, and the lifting platform is not carried by the transport vehicle.

2. The method of claim 1 wherein the chassis is elongated longitudinally between a front end and a back end, and the chassis is positioned on the platform with the entire chassis extending in one direction away from the hinged axis of the lifting platform, such that rotating the lifting platform around the hinged axis tilts the entire chassis through an arc from the hinged axis and towards the elevated position, in which a longitudinal axis of the chassis approaches or assumes an upright orientation.

3. The method of claim 2 in which the transport vehicle includes a mechanism for grasping the chassis and removing it from the lifting platform, when the chassis is in the elevated position, to support the chassis for transport.

4. A method of storing a cargo container chassis, comprising the steps of:

providing a lifting platform that pivots around a hinged axis, wherein the lifting platform has an upper surface and a lower surface;

positioning the chassis on the upper surface of the lifting platform;

rotating the lifting platform around the hinged axis, to tilt the lifting platform and raise the chassis to an elevated position in which the chassis is transferred to a transport vehicle;

wherein the transport vehicle includes a support element that is inserted under the chassis when the chassis is in the elevated position to lift the chassis on to the transfer vehicle, without clamping the chassis to rotate it and move its longitudinal axis toward an upright orientation.

5. The method of claim 4 in which the transport vehicle transports the chassis to a storage structure in which the chassis is stored in a generally upright position.

6. The method of claim 5 in which the chassis comprises a trailer frame extending longitudinally between a rear end and a front end of the frame, with a set of rear wheels supporting the rear end of the frame, and a downwardly projecting support jack supporting the front end of the frame, and the chassis is positioned on the lifting platform with the rear end of the chassis adjacent the hinged axis, such that rotating the lifting platform around the hinged axis rotates the front end of the trailer frame upwardly through an arc, while the rear end of the trailer frame is rotated downwardly.

7. The method of claim 6 in which the lifting platform further comprises a support member extending from the upper surface of the lifting platform, and the chassis is positioned on the lifting platform such that the rear end of the trailer frame abuts against and is supported by the support member as the lifting platform is rotated about the hinged axis.

8. The method of claim 7 wherein the support element of the transport vehicle is inserted under the chassis by inserting the support element through slots in the support member.

9. The method of claim 5 in which the transport vehicle transports the chassis to the storage structure in generally the same elevated position in which the chassis is transferred to the transport vehicle, and the chassis is stored in the storage structure in generally the same elevated position in which it was transported to the storage structure.

10. The method of claim 9 in which the chassis is stored in the storage structure by suspending the chassis from the front end of the frame.

11. The method of claim 9 in which the storage structure comprises a rack supported above a support surface, a plurality of chassis support arms mounted on the rack at spaced positions for movement between a retracted position adjacent the rack and an extended position projecting laterally outward of the rack for supporting the chassis disposed on end in a substantially upright position, and the chassis is stored in the storage structure by supporting the chassis with the support arms when the support arms are in the extended position.

12. The method of claim 4 wherein the transport vehicle further includes a stabilizing member spaced above the support element, wherein the stabilizing member engages and at least partially surrounds the chassis to stabilize it on the support element without clamping the chassis.

13. A method of storing a cargo container chassis, comprising the steps of:

providing a lifting platform that pivots around a hinged axis, wherein the lifting platform has an upper surface and a lower surface;

positioning the chassis on the upper surface of the lifting platform;

rotating the lifting platform around the hinged axis, to tilt the lifting platform and raise the chassis to an elevated position in which the chassis is transferred to a transport vehicle;

wherein the lifting platform is rotated around the hinged axis by exerting force against the lower surface of the lifting platform.

14. The method of claim 13 wherein force is exerted against the lower surface of the lifting platform by providing a hydraulic ram beneath the platform that pushes against the lower surface to rotate the platform around the hinged axis.

15. The method of claim 13 wherein the hydraulic ram comprises a piston and cylinder assembly extending at an angle from a mounting position below the lifting platform up towards the lower surface of the lifting platform, and the piston and cylinder are each hinged to allow the hydraulic ram to pivot as the piston is advanced from the cylinder.

16. A method of storing an elongated cargo container chassis that includes a trailer frame extending longitudinally between a rear end and a front end of the frame, with a set of rear wheels supporting the rear end of the frame, and a downwardly projecting support jack supporting the front end of the frame, comprising the steps of:

provic a lifting platform that pivots around a hinged axis, wherein the lifting platform has an upper surface and a lower surface, and a support member extending upwardly from the upper surface of the lifting platform;

positioning the chassis on the upper surface of the lifting platform with the support member preventing the chassis from rolling past the support member;

rotating the lifting platform around the hinged axis to tilt the chassis such that the rear end of the frame is supported passively by the support member as the lifting platform is rotated, and the front end of the frame is tilted through an arc towards an elevated position in which the chassis approaches or assumes a vertical orientation;

transferring the chassis in the elevated position from the lifting platform to a transport vehicle having a support element that abuts the rear end of the frame and lifts the frame away from the support member, and securing the chassis to the transport vehicle without the transport vehicle actively tilting the chassis upward; and storing the chassis in a generally upright orientation.

17. A method of storing an elongated cargo container chassis that includes a trailer frame extending longitudinally between a rear end and a front end of the frame, with a set of rear wheels supporting the rear end of the frame, and a downwardly projecting support jack supporting the front end of the frame, comprising the steps of:

providing an elongated lifting platform with a flat upper surface and a lower surface, in which the lifting platform pivots around a substantially horizontal hinged axis from a flat position in which the upper surface is coextensive with a surrounding support surface, to a raised position in which a longitudinal axis of the platform approaches or assumes a vertical orientation, further wherein a support member extends outwardly from the upper surface of the lifting platform along the hinged axis, the support member extending at least as high as the chassis;

positioning the chassis on the upper surface of the lifting platform with a tractor, with the rear end of the trailer frame abutting the support member, then disconnecting the tractor from the chassis and removing the tractor from the lifting platform;

rotating the lifting platform around the hinged axis to tilt the chassis such that the rear end of the frame is supported passively by the support member as the lifting platform is rotated, and the front end of the frame is tilted upward though an arc towards an elevated position, further wherein the lifting platform is rotated around the hinged axis by exerting a force against the lower surface of the lifting platform with a hydraulic ram that is pivotally connected to allow the ram to pivot as it rotates the lifting platform through an arc;

transferring the chassis in the elevated position from the lifting platform to a transport vehicle, wherein the transport vehicle is provided with a lower support element and an upper stabilizing element, and the chassis is transferred by introducing the lower support element between the support member and the rear end of the trailer frame, and securing the chassis to the transport vehicle without the transport vehicle tilting the chassis upward; and transporting the chassis in the transport vehicle to a storage structure in the same general position on which the chassis is transferred to the transport vehicle, and the chassis is stored in the storage structure in the same general position in which it was transported on the transport vehicle by supporting the front end of the chassis with a support rack in the storage structure.

18. A cargo container chassis storage system, comprising a tiltable powered lifting platform that is tiltable between a substantially horizontal loading position and a substantially upright tilted unloading position; and a transport vehicle, separate from the lifting platform, having a transfer attachment that is capable of grasping a chassis located on the lifting platform when the lifting platform is in the unloading position.

19. The system of claim 18 wherein the lifting platform rotates around a hinged axis.

20. The system of claim 19 wherein the lifting platform is rotated around the hinged axis by a powered ram exerting force against a lower surface of the lifting platform.

21. The system of claim 20 wherein the powered ram is a piston and cylinder assembly extending at an angle from a mounting position below the lifting platform up towards the lower surface of the lifting platform, and the piston and cylinder are each hinged to allow the hydraulic ram to pivot as the piston is advanced from the cylinder.

22. The system of claim 19 wherein the lifting platform further comprises a support element comprising a member extending from an upper surface of the lifting platform in a position suitable for supporting the chassis against movement rearwardly on the lifting platform as the lifting platform is being tilted.

23. The system of claim 22 wherein the support member is hingedly connected to the lifting platform, such that the support member can move between a substantially horizontal loading position and an upright position in which it supports the chassis against movement rearwardly as the lifting platform is tilted.

24. The system of claim 22 wherein the transport vehicle further includes a stabilizer spaced above the support element, for abutting and supporting a portion of the chassis above the support element without clamping the chassis.

25. The system of claim 24 wherein the stabilizer comprises a pair of arms extending outwardly from the transport vehicle, and a pair of extendable, retractable cross bars carried by the arms and projecting towards each other.

26. The system of claim 18 further comprising a storage structure suitable for storing the chassis in a generally upright position.

27. The system of claim 18 further comprising a storage structure that includes a rack supported above a support surface, a plurality of chassis support arms mounted on the rack at spaced positions for movement between a retracted position adjacent the rack and an extended position projecting laterally outward of the rack for supporting a chassis disposed on end in a substantially upright position.

28. A cargo container chassis storage system, comprising:
- a tiltable powered lifting platform that is tiltable between a substantially horizontal loading position and a substantially upright tilted unloading position;
- a transport vehicle having a transfer attachment that is capable of grasping a chassis located on the lifting platform when the lifting platform is in the unloading position; and
- a support element for abutting and supporting a rear end of the chassis.

29. A system for storing a cargo container chassis in a generally upright position, comprising:
- a tiltable lifting platform that is tiltable around a hinged axis between a generally flat loading position and a tilted unloading position;
- a support member extending from an upper surface of the lifting platform to support the chassis against movement rearwardly on the lifting platform as the lifting platform is tilted;
- a powered ram below the platform for exerting force against a lower surface of the lifting platform to tilt the platform to the tilted unloading position;
- a transport vehicle having a transfer attachment comprising a lifting member for abutting a rear face of the chassis and exerting a lifting force against the rear face of the chassis to transfer the chassis from the platform to the transport vehicle when the platform is in the tilted unloading position, and a stabilizer for stabilizing a chassis on the support member; and
- a storage structure for storing a chassis in a generally upright orientation, wherein the storage structure comprises a rack supported above a support surface, and support members on the rack suitable for holding the chassis in a substantially upright orientation.

* * * * *